(12) United States Patent
Roussos (10) Patent No.: US 7,440,725 B2
(45) Date of Patent: Oct. 21, 2008

(54) METHOD OF EVALUATION FIT OF RAW DATA TO MODEL DATA

(75) Inventor: Louis Ablen Roussos, Rochester, NH (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 11/465,653

(22) Filed: Aug. 18, 2006

(65) Prior Publication Data

US 2007/0299644 A1 Dec. 27, 2007

Related U.S. Application Data

(63) Continuation of application No. 10/836,110, filed on Apr. 29, 2004, now Pat. No. 7,095,979.

(60) Provisional application No. 60/466,319, filed on Apr. 29, 2003.

(51) Int. Cl.
*G09B 7/00* (2006.01)
(52) U.S. Cl. ........................................ 434/353; 434/354
(58) Field of Classification Search ................ 434/322, 434/323, 327, 350, 353, 354
See application file for complete search history.

(56) References Cited

U.S. PATENT DOCUMENTS 5,326,270 A * 7/1994 Ostby et al. ................. 434/362
5,597,312 A * 1/1997 Bloom et al. ................ 434/362
6,018,731 A * 1/2000 Bertrand et al. ............... 706/47
6,125,358 A * 9/2000 Hubbell et al. ................ 706/11
6,484,010 B1 * 11/2002 Sheehan ...................... 434/362
6,524,109 B1 * 2/2003 Lacy et al. ................... 434/219
6,526,258 B2 * 2/2003 Bejar et al. .................. 434/350
6,705,872 B2 * 3/2004 Pearson et al. ............... 434/322
6,772,081 B1 * 8/2004 Gedlinske et al. ............ 702/108
6,790,045 B1 * 9/2004 Drimmer ..................... 434/336
6,808,393 B2 * 10/2004 Mascarenhas ............... 434/322
6,978,115 B2 * 12/2005 Whitehurst et al. .......... 434/350

* cited by examiner

*Primary Examiner*—Kurt Fernstrom
(74) *Attorney, Agent, or Firm*—Mayer Brown LLP (57) ABSTRACT

Methods and systems for evaluating the fit of raw data to model data are disclosed. Relationships between an assessment item and a tested attribute, responses from examinees to an assessment item, mastery states for an examinee for a tested attribute, one or more parameters based on expected assessment item performance, estimates for non-tested attributes for each examinee, likelihoods that an examinee that has mastered attributes pertaining to an assessment item will answer the item correctly, likelihoods that an examinee that has not mastered an attribute for an assessment item will answer the item correctly, and/or other variables may be received. For each item and/or for each examinee, a determination of a class for the examinee and/or item may be determined. Statistics may also be generated for each examinee, each item, an examination and/or any other basis.

5 Claims, 8 Drawing Sheets

METHOD OF EVALUATION FIT OF RAW DATA TO MODEL DATA

CLAIM OF PRIORITY

This application claims priority to and is a continuation of U.S. Non-Provisional application Ser. No. 10/836,110 filed Apr. 29, 2004, which further claims priority to U.S. Pat. No. 6,832,069 issued Dec. 14, 2004 titled "A Latent Property Diagnosing Procedure" and U.S. Provisional Application No. 60/466,319 filed Apr. 29, 2003 titled "Method for Evaluation Fit of Raw Data to Model Data" each of which is incorporated herein by reference in its entirety.

TECHNICAL FIELD

The present invention relates generally to the field of assessment evaluation. In particular, the invention relates to providing a method and system for evaluating assessment examinees on a plurality of attributes based on responses to assessment items, evaluating assessment items based on the ability to determine one or more attributes of an assessment examinee, and evaluating an assessment examination based on the responses of assessment examinees.

BACKGROUND

Standardized testing is prevalent in the United States today. Such testing is used for higher education entrance examinations and achievement testing at the primary and secondary school levels. The prevalence of standardized testing in the United States has been further bolstered by the No Child Left Behind Act of 2001, which emphasizes nationwide test-based assessment of student of student achievement.

At the same time, standardized testing is accused of a variety of failings. One criticism of standardized testing is that it can only assess a student's abilities generally, but cannot adequately determine whether a student has mastered a particular ability or not. Accordingly, standardized testing is seen as inadequate in assisting teachers with developing a level of mastery for a student in all subject matters.

Because of this limitation, cognitive modeling methods, also known as skills assessment or skills profiling, have been developed for assessing students' abilities. Cognitive diagnosis statistically analyzes the process of evaluating each examinee on the basis of the level of competence on an array of skills and using this evaluation to make relatively fine-grained categorical teaching and learning decision about each examinee. Traditional educational testing, such as the use of an SAT score to determine overall ability, performs summative assessment. In contrast, cognitive diagnosis performs formative assessment, which partitions answers for an assessment examination into fine-grained (often discrete or dichotomous) cognitive skills or abilities in order to evaluate an examinee with respect to his level of competence for each skill or ability. For example, if a designer of an algebra test is interested in evaluating a standard set of algebra attributes, such as factoring, laws of exponents, quadratic equations, and the like, cognitive diagnosis attempts to evaluate each examinee with respect to each such attribute, whereas summative analysis simply evaluates each examinee with respect to an overall score on the algebra test.

One assumption of all cognitive diagnosis models is that the assessment items (i=1, ..., I) relate to a set of cognitive attributes (k=1, ..., K) in a particular manner. The relationships between assessment items and cognitive attributes are generally represented in a matrix of size l×K and having values $Q=\{q_{ik}\}$, where $q_{ik}=1$ when attribute k is required by item i and $q_{ik}=0$ when attribute k is not required by item i.

Using the Q matrix representation, conventional approaches to cognitive Diagnosis were developed to either (1) diagnose examinees, by assigning mastery or non-mastery of each attribute to each examinee, without determining the cognitive structure of the exam, or (2) cognitively evaluate the exam, by statistically evaluating the relationships between the items and the attributes, without diagnosing the cognitive abilities of the examinees. If items are not cognitively evaluated, a cognitive diagnosis has little meaning except with relation to the particular assessment examination. Likewise, if cognitive diagnosis is not performed on examinees, a cognitive evaluation of the items cannot be aligned with the observed examinee response data. As a result, the interpretation of an evaluation of the assessment item does not relate to examinees. Moreover, in order to be useful for evaluation purposes, the parameters of a cognitive diagnosis model must be statistically identifiable. No conventional method incorporates all of these requirements.

What is needed is a method and system for performing cognitive diagnosis that evaluates both assessment items and assessment examinees using statistically identifiable parameters.

A further need exists for a method and system for evaluating assessment examinees with respect to a plurality of attributes based on responses to assessment items.

A further need exists for a method and system for evaluating whether assessment items assist in determining one or more attributes of an assessment examinee.

A still further need exists for a method and system for evaluating an assessment examination based on the responses of assessment examinees.

The present invention is directed to solving one or more of the problems described above.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an,"and "the"include plural references unless the context clearly dictates otherwise. Thus, for example, reference to an "assessment item" is a reference to one or more assessment items and equivalents thereof known to those skilled in the art and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

In an embodiment, a method for evaluating the fit of raw data to model data includes receiving a plurality of associations, wherein each association pertains to a relationship between one of a plurality of assessment items for an assessment examination and one of a plurality of attributes, receiving a plurality of responses, wherein each response pertains to an answer by one of a plurality of examinees to one of the plurality of assessment items, receiving a plurality of mastery estimates, wherein each mastery estimate represents whether one of the plurality of examinees has mastered one of the plurality of attributes, determining whether an examinee falls into at least one of a plurality of examinee classes for an assessment item based upon the mastery estimates for the examinee and the associations for the assessment item, generating one or more statistics, wherein each statistic is based on one or more of the associations, responses and mastery estimates, and outputting at least one of the one or more statistics. The one or more statistics may include a percentage of correct answers for an assessment item for each of the plurality of examinee classes associated with the assessment item and/or a percentage of correct answers for the assessment examination for each of the plurality of examinee classes.

The plurality of examinee classes may include a master class associated with an assessment item. The master class includes all examinees having a mastery estimate for each attribute associated with the assessment item. The plurality of examinee classes may further include a high non-master class associated with an assessment item, and a low non-master class associated with the assessment item. The high non-master class includes all examinees having a mastery estimate for at least one-half of all attributes, but not all attributes, associated with the assessment item. The low non-master class comprises all examinees having a mastery estimate for less than one-half of all attributes associated with the assessment item. The one or more statistics may include a difference between a percentage of correct answers for the assessment examination for the master class for an assessment item and the percentage of correct answers for the assessment examination for the low non-master class for the assessment item, a difference between a percentage of correct answers for the assessment examination for the master classes for all assessment items and the percentage of correct answers for the assessment examination for the low non-master classes for all assessment items, a difference between a percentage of correct answers for the assessment examination for the master classes for all assessment items and the percentage of correct answers for the assessment examination for the high non-master classes for the assessment item, and/or a difference between a percentage of correct answers for the assessment examination for the master classes for all assessment items and the percentage of correct answers for the assessment examination for the high non-master classes for all assessment items.

The plurality of examinee classes may further include a non-master class. The non-master class includes all examinees not having a mastery estimate for at least one attribute associated with an assessment item. The one or more statistics include a difference between a percentage of correct answers for the assessment examination for the master class for an assessment item and the percentage of correct answers for the assessment examination for the non-master class for the assessment item and/or a difference between a percentage of correct answers for the assessment examination for the master classes for all assessment items and the percentage of correct answers for the assessment examination for the non-master classes for all assessment items.

In an embodiment, a method for evaluating the fit of raw data to model data includes receiving a plurality of associations, wherein each association pertains to a relationship between one of a plurality of assessment items for an assessment examination and one of a plurality of attributes, receiving a plurality of responses, wherein each response pertains to an answer by one of a plurality of examinees to one of the plurality of assessment items, receiving a plurality of mastery estimates, wherein each plurality of mastery estimates represents whether one of the plurality of examinees has mastered one of the plurality of attributes, receiving one or more parameters based on an expected assessment item performance, determining whether an item for an examinee falls into at least one of a plurality of item classes based upon the mastery estimates for the examinee and the associations for the assessment item, generating one or more statistics, wherein each statistic is based on one or more of the associations, responses, mastery estimates and parameters, and outputting at least one of the one or more statistics. In an embodiment, the method may further include receiving one or more allowability limits. Each allowability limit defines a threshold number of items for each of a plurality of item classes required for an examinee to be an allowable examinee. In an embodiment, the determining step may include defining a plurality of item types, determining a list of allowable examinees for each item class based on the allowability limit and, for each allowable examinee for an item class, computing a proportion of items in the item class that the allowable examinee answered correctly. In an embodiment, the determining step further includes computing the average proportion of items for all allowable examinees for each item class. In an embodiment, the determining step further includes performing a binomial hypothesis test on each allowable examinee, and determining whether the allowable examinee meets the criterion level for the item class.

The one or more statistics may include one or more results of the binomial hypothesis tests, a list of allowable examinees that did not meet the criterion level for the item class, a proportion correct for each allowable examinee, and/or an average proportion correct for all allowable examinees for an item class. The plurality of item classes may include a master class associated with an examinee. The master class comprises all items for which an examinee has a mastery estimate for each attribute associated with an assessment item. In an embodiment, the plurality of item classes may further include a high non-master class associated with an examinee, and a low non-master class associated with an examinee. The high non-master class comprises all items for which an examinee has a mastery estimate for at least one-half of all attributes, but not all attributes, associated with an assessment item. The low non-master class comprises all items for which an examinee has a mastery estimate for less than one-half of all attributes associated with an assessment item. In an embodiment, the plurality of item classes further comprises a non-master class. The non-master class comprises all items for which an examinee does not have a mastery estimate for at least one attribute associated with an assessment item.

In a embodiment, a method for evaluating the fit of raw data to model data including receiving a plurality of associations, wherein each association pertains to a relationship between one of a plurality of assessment items for an assessment examination and one of a plurality of attributes, receiving a plurality of responses, wherein each response pertains to an answer by one of a plurality of examinees to one of the plurality of assessment items, receiving a plurality of mastery estimates, wherein each mastery estimate represents whether one of the plurality of examinees has mastered one of the plurality of attributes, receiving a plurality of proficiency estimates for non-tested attributes for each examinee, receiving a plurality of item parameter estimates of each item, generating one or more statistics, wherein each of the statistics is based on one ore more of the associations, responses mastery probabilities, proficiency estimates, and item probabilities, and outputting at least one of the one or more statistics. The plurality of item para meter estimates may include receiving a plurality of first probabilities, wherein each first probability is a measure of a likelihood that an examinee that has mastered the attributes pertaining to an assessment item will answer the assessment item correctly, receiving a plurality of second probabilities, wherein each second probability is a measure of a likelihood that an examinee that has not mastered an attribute pertaining to an assessment item will answer the assessment item correctly, and receiving a plurality of weights, wherein each weight is a measure of the relevance of the plurality of proficiency estimates for an examinee. The one or more statistics may include, for each examinee and each item, determining a probability that the examinee answered the item correctly based on the associations, mastery estimates, proficiency estimates and item parameter estimates. The one or more statistics may further include, for each examinee, one or more of an observed score computed by summing the responses by the examinee, a predicted score computed by summing the probabilities associated with the examinee, and a residual score computed by subtracting the observed score from the predicted score. The one or more statistics may further include, for each item, one or more of an observed score computed by summing the responses to the item, a predicted score computed by summing the probabilities associated with the item and a residual score computed by subtracting the observed score from the predicted score.

In an embodiment, a method for evaluating the fit of raw data to model data may include receiving a plurality of associations, wherein each association pertains to a relationship between one of a plurality of assessment items for an assessment examination and one of a plurality of attributes, receiving a plurality of responses wherein each response pertains to an answer by one of a plurality of examinees to one of the plurality of assessment items, receiving a plurality of mastery estimates files, wherein each mastery estimate files contains a set of mastery estimates, wherein each mastery estimate represents whether one of the plurality of examinees has mastered on e of the plurality of attributes, receiving a plurality of mastery parameters, determining whether each examinee falls into at least one of a plurality of examinee classes for an assessment item based upon the mastery probabilities for the examinee and the associations for the assessment item, optimizing a plurality of mastery thresholds, generating one or more statistics, wherein each statistic is based on one or more of the associations, responses, mastery probabilities and mastery parameters, wherein the one or more statistics comprise one or more mastery thresholds, and outputting at least one of the one or more statistics. In an embodiment, optimizing a plurality of mastery thresholds may include for each examinee class, performing an algorithm using the associations, responses, mastery estimates and mastery parameters to obtain a result, calculating maximization criteria based on the results for each examine class, applying the maximization criteria to the mastery thresholds, and repeating the performing, calculating and applying steps until the mastery thresholds converge within a threshold range. The plurality of examinee classes may include a master class, wherein the master class comprises all examinees having a mastery state for each attribute associated with an assessment item, a high non-master class, wherein the high non-master class comprises all examinees having a mastery state for at least one-half of all attributes, but not all attributes, associated with an assessment item, and a low non-master class, wherein the low non-master class comprises all examinees having a mastery state for less than one-half of all attributes associated with an assessment item.

In an embodiment, the maximization criteria comprises maximizing the average of the difference between the average proportion correct for the master class and the average proportion correct for the high non-master class and difference between the average proportion correct for the master class and the average proportion correct for the low non-master class. The one or more statistics may include one or more of the maximization criteria for a group of mastery thresholds, the average proportion correct for the master class, the average proportion correct for the high non-master class, and the average proportion correct for the low non-master class.

In an embodiment, a system for evaluating the fit of raw data to model data includes a processor and a computer-readable storage medium operably connected to the processor for performing one or more of the methods described above.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

The present invention relates to a method and system for evaluating assessment items, assessment examinations and examinees using statistically identifiable parameters.

Item response functions may be used to determine the probability that an examinee correctly answers a particular assessment item based on the examinee's mastery of one or more attributes evaluated with respect to an assessment examination. The item response function of the present invention further models whether an examinee has mastered non-evaluated attributes that are relevant to correctly answering a particular assessment item. In particular, an examinee that has mastered more evaluated attributes may be expected to have a higher likelihood of having mastered non-evaluated attributes than an examinee that has mastered fewer evaluated attributes. This is particularly the case for a cognitive test where the evaluated abilities are dimensionally close to one another (i.e., the attributes are not statistically independent of each other).

In an embodiment, the item response function may be as follows:

$$P(X_{ij} = 1 \mid \alpha_j, \theta_j) = \pi_i^* \prod_{k=1}^{K} r_{ik}^{*(1-\alpha_{jk})q_{ik}} P_{c_i}(\theta_j),$$

where:

$\alpha_{jk}$=the cognitive attributes k specified for examinee j.

$\theta_j$=a unidimensional projection of examinee j's ability to perform skills outside of the Q matrix attributes;

$$\pi_i^* = \prod_{k=1}^{M} \pi_{ik}^{q_{ik}} =$$

the baseline probability that an examinee that has mastered all attributes for a particular item i will correctly apply all the attributes when solving item i:

$$r_{ik}^* = \frac{r_{ik}}{\pi_{ik}} = \frac{P(Y_{ijk} = 1 \mid \alpha_{jk} = 0)}{P(Y_{ijk} = 1 \mid \alpha_{jk} = 1)} =$$

the baseline probability that an examinee lacking an attribute k that is required for a particular item i will correctly answer item i;

$Y_{ijk}$=1 when examinee j correctly applies attribute k to item i; and $c_i$=the amount the item response function relies on $\theta_j$, after accounting for the attributes in the Q matrix ($0 \leq c_i \leq 3$).

In an embodiment, the present invention uses a Bayesian model to estimate unknown parameters. A Bayesian model may permit flexibility in parameter relationships and simplify estimation procedures. In addition, the Bayesian model may use hierarchical relationships and correlations between attributes. While conventional Bayesian networks do not allow probabilistic relationship to restrict conditional probabilities, the probability structure of interest in the present invention may be combined with relationships between the attributes by using hierarchical Bayesian modeling.

In constructing a Bayesian model, the prior distributions and their parameters, as well as the prior distributions of the parameters, are constructed so that the estimated values for the unknown variables are determined predominantly by the evaluation data and not by the prior distributions. A prior distribution (or "prior") refers to information available before (and in addition to) information coming from the collected data.

Figure 1:
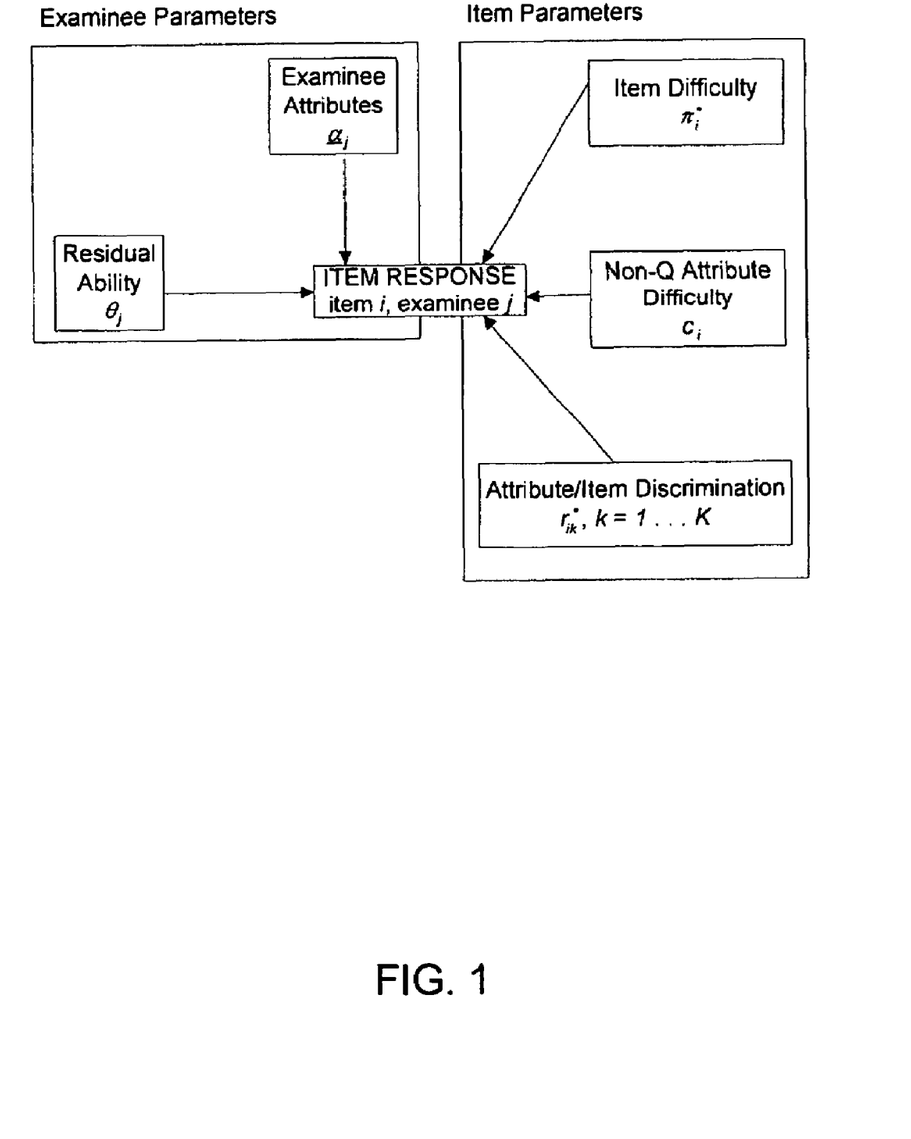
FIG. 1 depicts an exemplary probabilistic structure for an item response according to an embodiment of the present invention.

FIG. 1 depicts an exemplary probabilistic structure for an item response according to an embodiment of the present invention. As shown in FIG. 1, the item response for an item i performed by an examinee j is dependent on examinee parameters $\overline{\alpha}_j$ (examinee j's attributes) and $\theta_j$ (examinee j's residual ability), and item parameters $\pi_i^i$ (item difficulty for item i), $r_{ik*}$ (attribute discrimination for attributes 1 . . . K for item i), and $c_i$ (item i difficulty not associated with attributes 1 . . . K). To construct a Bayesian model from the probabilistic structure in FIG. 1, Bayesian priors for the parameters are added to the model, which define relationships between variables. In addition, non-informative priors may be constructed for the unknown relationships or distributions so that the data reveals detailed aspects of the relationships between the variables.

Figure 2:
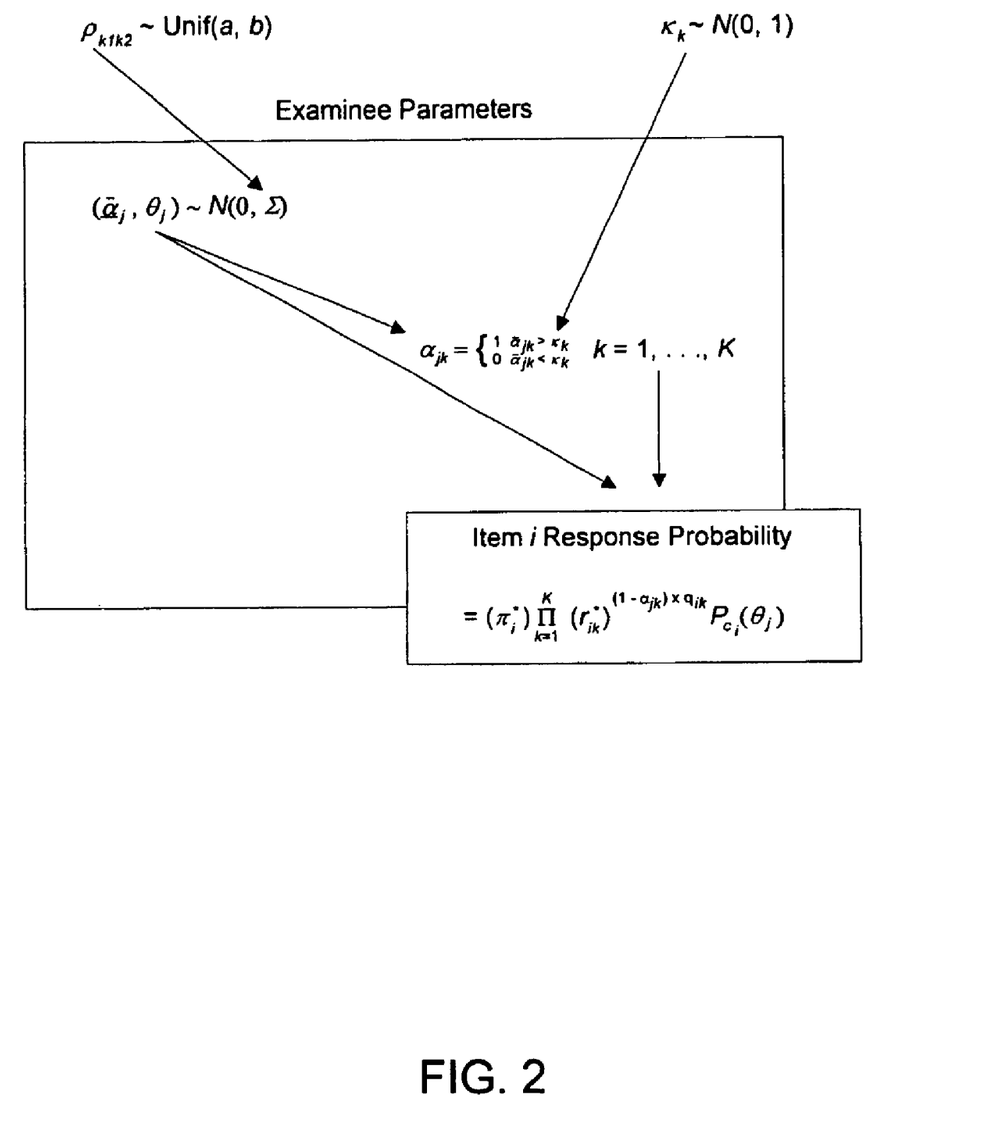
FIG. 2 depicts an exemplary hierarchical Bayesian model for the examinee parameters according to an embodiment of the present invention.

$\overline{\alpha}_{jk}$ for k=1, . . . K may standard normal priors that are used to generate dichotomous $\alpha_{jk}$, k=1, . . . K. Likewise $\theta_j$ may have a standard normal prior. Since the examinee attributes have a positive correlation $(\overline{\alpha}_j, \theta_j) \sim N(0, \Sigma)$ where $\Sigma = \{\rho_{k1k2}\}$ has 1's on the diagonal for the marginal variances of the attributes and the non-negative pairwise correlations between $(\overline{\alpha}_j, \theta_j)$ as the off-diagonal elements. Correlations between attributes may be defined as hyperparameters. The correlations may have a uniform prior over some interval $\rho_{k1k2} \sim \text{Unif}(a, b)$, where 0<a<b<1. The hyperparameter $\kappa_k$ may be used as a 'cutoff' for mastery of attribute k. When $\overline{\alpha}_{jk} > \kappa_k$, $\alpha_{jk}=1$, the examinee may be considered to have mastered the attribute. FIG. 2 depicts an exemplary hierarchical Bayesian model for the examinee parameters according to an embodiment of the present invention.

A Beta distribution with a unit interval may be used to represent each of the item parameters $\pi_{i*}$, $r_{ik*}$, and $$\frac{c_i}{3} (c_i \in (0, 3)).$$

Each Beta distribution may use two parameters, a and b, which define the shape of the distribution. The mean of the Beta distributions is $$\mu = \frac{a}{a+b} \text{ and}$$

the variance is $$\sigma^2 = \frac{\mu(1-\mu)}{1+a+b}.$$

The following priors may be assigned:

$$\pi_i^* \sim \beta(a_\pi, b_\pi), r_{ik}^* \sim \beta(a_r, b_r) \text{ and } \frac{c_i}{3} \sim \beta(a_c, b_c).$$

Figure 3:
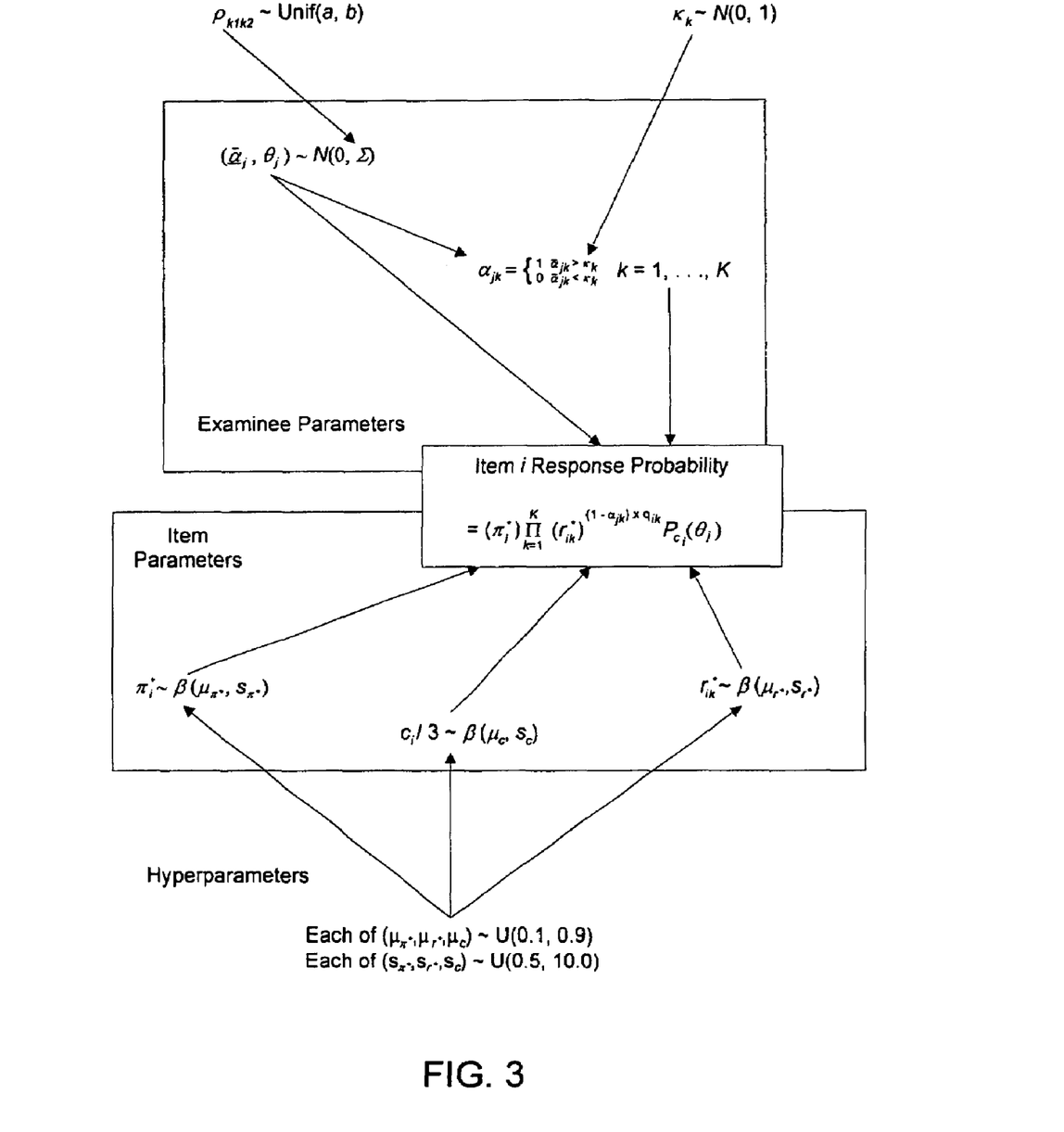
FIG. 3 depicts an exemplary hierarchical Bayesian model according to an embodiment of the present invention.

The hyperparameters are given Uniform priors over a restricted range to permit flexibility in the shape of the distribution. The {a, b} parameters of each Beta distribution may be re-formulated into the mean and an inverse measure of the spread x=a+b (for constant μ, $$\sigma^2 = \frac{\mu(1-\mu)}{1+s}$$

is inversely proportional to (1+s)). FIG. 3 depicts an exemplary hierarchical Bayesian model according to an embodiment of the present invention and incorporating each of the item and examinee parameters, hyperparameters and priors.

The use of complex Bayesian models with may parameters has become a reasonable foundation for practical statistical inference because of the Markov Chain Monte Carlo (MCMC) simulation-bases computational approach. MCMC statistically analyzes data sets produced by Bayesian models by bypassing the computation of complicated posterior distributions of the parameters. A Markov Chain Monte Carlo (MCMC) approach to data analysis may be used to perform cognitive diagnosis of the Bayesian model described above. The MCMC approach may also permit flexibility in inferring stochastic relationships among the model parameters and in easily incorporating additional parameters into the model. In an embodiment, the MCMC algorithm may be implemented by the Metropolis-Hastings within Gibbs sampler algorithm. The Metropolis-Hastings within Gibbs sampler algorithm is one of numerous variations of the MCMC approach. Accordingly, the invention disclosed herein is not limited to this algorithm, but is meant to encompass all MCMC algorithms In the case of MCMC, the simulated random numbers of the Markov Chain are probabilistically dependent. The MCMC simulation may produce a "chain" of random numbers whose steady state probability distribution is the desired posterior distribution. If the chain is run for a sufficient number of iterations, the observed distribution of its simulated random numbers may be approximately equal to the required posterior distribution.

MCMC may simulate a Markov Chain in a parameter space $\vartheta$ of the statistical model that converges to p($\vartheta$|data), the posterior distribution of $\vartheta$ given the data. From the Bayesian perspective, all statistical inference depends upon the estimation of the posterior distribution p($\vartheta$|data). In a MCMC-based statistical analysis, a Markov model having a stationary distribution equal to the posterior distribution p($\vartheta$|data) may be created and simulated. Estimating the posterior distribution entails performing a series of draws of $\vartheta$ from a particular probability distribution where $\vartheta^l$ represents draw l of the Markov Chain. A sufficient number of draws may be required to accurately estimate the stationary distribution.

The Metropolis-Hastings algorithm is designed to estimate the stationary distribution using a transition distribution for the current state $\vartheta^l$ depending on the previous state $\vartheta^{l-q}$. At each step l, the Metropolis-Hastings algorithm stochastically decides whether to remain at the previous state or move to a new state. The choice of the candidate new state $\vartheta^l$ is drawn from the user-defined probability distribution $J_l(\vartheta^l, \vartheta^{l-1})$, representing the probability of drawing $\vartheta^l$ as the candidate parameter given that $\vartheta^{l-1}$ was the last step of the Markov Chain.

In an embodiment, the Metropolis-Hastings algorithm may perform the following steps:

1) Sample $\vartheta^l$ from $N(\vartheta^{l-1}, \Sigma)$, for a suitable covariance matrix $\Sigma$;
2) Calculate $$r = \frac{P(\vartheta^*|data)/J_t(\vartheta^*|\vartheta^{t-1})}{P(\vartheta^{t-1}|data)/J_t(\vartheta^{t-1}|\vartheta^*)}$$

-continued $$\frac{P(data|\vartheta^*)P(\vartheta^*)/J_t(\vartheta^*|\vartheta^{t-1})}{P(data|\vartheta^{t-1})P(\vartheta^{t-1})/J_t(\vartheta^{t-1}|\vartheta^*)}; \text{ and}$$

3) Set $$\vartheta^t = \begin{cases} \vartheta^* & \text{with probability min}(r, 1) \\ \vartheta^{t-1} & \text{otherwise} \end{cases}.$$

The Bayesian model, such as the one depicted in FIG. 3, supplies the likelihood P(data|$\vartheta$) and the prior distribution P($\vartheta$). For item response theory applications, $J_t(\vartheta^l|\vartheta^{l-1}) = J_t(\vartheta^{l-1}|\vartheta^l)$ (i.e., $J_t(\vartheta^l|\vartheta^{l-1})$ is chosen to by symmetric).

The Gibbs sampler, also known as "alternating conditional sampling," may simplify the required Metropolis-Hastings likelihood calculations by partitioning $\vartheta = (\vartheta_1, \ldots \vartheta_d)$ into lower dimensional sub-vectors $\vartheta_i^l$. The MCMC algorithm may then be performed for each sub-vector, where the likelihood for $\vartheta_i^l$ is determined by using the conditional distribution of $\vartheta_i^l$ given all the other components of $\vartheta$: $P(\vartheta_i^l|\vartheta_i^{l-1}, data)$, where $\vartheta_{-i}^{l-1} = (\vartheta_1^l, \ldots, \vartheta_{i-1}^l, \vartheta_d^{l-1})$. Thus, the Metropolis-Hastings algorithm within the Gibbs sampler may partition $\vartheta$ into item parameters and examinee parameters such that the item parameters depend only on the examinee parameters and the examinee parameters depend only on the item parameters. Accordingly, the algorithm for a $l^{th}$ step of a Markov Chain may be computed using the following steps:

1) For each item i, sample $(\vartheta_i^l|\vartheta_j^{l-1} \ldots 1, data)$ using the Metropolis-Hastings ratio r as follows:

$$r = \frac{P(\vartheta_i^*|\vartheta_{1\ldots J}^{t-1}, data)/J_t(\vartheta_i^*|\vartheta_i^{t-1})}{P(\vartheta_i^{t-1}|\vartheta_{1\ldots J}^{t-1}, data)/J_t(\vartheta_i^{t-1}|\vartheta_i^*)} =$$

$$\frac{P(\vartheta_{1\ldots J}^{t-1}, data|\vartheta_i^*)P(\vartheta_i^*)/J_t(\vartheta_i^*|\vartheta_i^{t-1})}{P(\vartheta_{1\ldots J}^{t-1}, data|\vartheta_i^{t-1})P(\vartheta_i^{t-1})/J_t(\vartheta_i^{t-1}|\vartheta_i^*)}$$

$$r = \frac{P(\vartheta_{1\ldots J}^{t-1}, data|\vartheta_i^*)P(\vartheta_i^*)}{P(\vartheta_{1\ldots J}^{t-1}, data|\vartheta_i^{t-1})P(\vartheta_i^{t-1})}.$$

2) For each examinee j, sample $(\vartheta_j^l|\vartheta_l^{l-1} \ldots 1, data)$ using the Metropolis-Hastings ratio r as follows:

$$r = \frac{P(\vartheta_j^*|\vartheta_{1\ldots I}^{t-1}, data)/J_t(\vartheta_j^*|\vartheta_{ji}^{t-1})}{P(\vartheta_j^{t-1}|\vartheta_{1\ldots I}^{t-1}, data)/J_t(\vartheta_j^{t-1}|\vartheta_j^*)} =$$

$$\frac{P(\vartheta_{1\ldots I}^{t-1}, data|\vartheta_j^*)P(\vartheta_j^*)/J_t(\vartheta_j^*|\vartheta_j^{t-1})}{P(\vartheta_{1\ldots I}^{t-1}, data|\vartheta_j^{t-1})P(\vartheta_j^{t-1})/J_t(\vartheta_j^{t-1}|\vartheta_j^*)}$$

$$r = \frac{P(\vartheta_{1\ldots I}^{t-1}, data|\vartheta_j^*)P(\vartheta_j^*)}{P(\vartheta_{1\ldots I}^{t-1}, data|\vartheta_j^{t-1})P(\vartheta_j^{t-1})}.$$

Applying the Metropolis-Hastings algorithm with Gibbs sampling to the present invention results in the following steps:

1) Sample the hyperparameters ($\underline{\mu}^l = (\mu_x^l, \mu_r^l, \mu_c^l)$; $\underline{s}^l = (s_x^l, s_r^l, s_c^l)$;
2) For each attribute k=1, . . . , K, sample the cutpoints ($\kappa_k^l$);
3) Sample the correlations (($\rho_{k1,k2}^l$, k1≠k2∈(1, . . . , M);

4) For each item i, sample the item parameters $((\pi_i^I)', (r_{1_k}^I)', k=1, \ldots, K)$;

5) For each item i, sample the item parameter $(c_i^I)$; and

6) For each examinee j, sample the examinee parameters $(\underline{\alpha}_j^I, \theta_j^I)$.

Sampling the hyperparameters (step 1) may include drawing the candidate parameters $\{\underline{\mu}^I, \underline{s}^I\}$ from a Normal distribution with mean $\{\underline{\mu}^{I-1}, \underline{s}^{I-1}\}$, the parameters from the previous step in the Markov Chain, and a variance of 0.1. Since only the item parameters depend on the hyperparameters, the likelihoods of data and all other model parameters given the two candidate vectors, $P(\text{data}, \vartheta_{items}, \vartheta_{examinees}, \vartheta_{correlations}, \vartheta_k | \{\underline{\mu}^I, \underline{s}^I\})$ and $P(\text{data}, \vartheta_{items}, \vartheta_{examinees}, \vartheta_{correlations}, \vartheta_k | \{\underline{\mu}^{I-1}, \underline{s}^{I-1}\})$, reduce to $P(\vartheta_{items} | \{\underline{\mu}^I, \underline{s}^I\})$ and $P(\vartheta_{items} | \{\underline{\mu}^{I-1}, \underline{s}^{I-1}\})$, respectively. In an embodiment, the likelihoods are calculated by using $P(\underline{\mu}, \underline{s} | (\pi^I)^{I-1}, (\underline{r}^I)^{I-1}, (\underline{c}^I)^{I-1})$ given that $(\pi_i^I)^{I-1} \sim \beta(\mu_{\pi^I}, s_{\pi^I})$, $(r_i^I)^{I-1} \sim \beta(\mu_{r^I}, s_{r^I})$, and $c_i^{I-1} \sim \beta(\mu_c, s_c)$.

Each mastery cutpoint $\kappa_k$ (step 2) may be dependent only on the dichotomous $\alpha_{jk}$, for each examinee $j=1, \ldots, J$. Each candidate parameter may be drawn $\kappa_k^I \sim N(\kappa_k^{I-1}, 0.03)$, where the distribution is truncated $|\kappa_k^I| < \alpha$, for appropriately chosen values $\alpha > 0$. For example, $\alpha = 0.52$ may correspond to truncating $\kappa_k$ at the thirtieth and seventieth percentile of the standard normal distribution. Since $\alpha_{jk}$ is linked to $\overline{\alpha}_{jk}$ via $\kappa_k(\alpha_{jk}=1$ if $\overline{\alpha}_{jk} > \kappa_k$, $\alpha_{jk}=0$, otherwise), the examinee candidate parameters $\underline{\alpha}_k^I = \{\alpha_{jk}^I, \ldots, \alpha_{jk}^I\}$ are defined by the candidate parameter $\kappa_k^I$ and $\underline{\alpha}$-$\mathbf{1}_k^I = \{\overline{\alpha}_{jk}^{I-1}, \ldots, \overline{\alpha}^{I-1}_{jk}\}$. The calculation of the likelihoods may use the following model-based relationship:

$$\prod_{j=1}^{J} P(\text{examinee } j \text{ responses} | \underline{\alpha}_j, \theta_j^{t-1}, (\pi^*)^{t-1}, (r^*)^{t-1}, (c^*)^{t-1}).$$

The correlations $\rho_{k_1 k_2}$ (step 3) may have a uniform prior on (0, 1). The necessary likelihoods in the Metropolis-Hastings algorithm require only the examinee parameters $(\overline{\alpha}^{I-1}, \theta^{I-1})$ and may be calculated by assuming $(\overline{\alpha}^{I-1}, \theta^{I-1})$ are normally distributed with the correlations $\rho_{k_1 k_2}$. Since the prior is uniform and the candidate distribution is symmetric, the only components of the Metropolis-Hastings ratio r are the likelihoods.

Each collection of correlations $\{\rho^I_{k_1 k_2}, k^I_1 \neq k^I_2 \epsilon (1, \ldots, M)\}$ must form a positive definite matrix. This condition must be satisfied at each step of the MCMC. However, if $\Sigma$ is a positive definite correlation matrix and $\Sigma^I$ differs from $\Sigma$ by only one off-diagonal matrix entry, a positive determinant of $\Sigma^I$ is a necessary and sufficient condition for $\Sigma^I$ to be a positive definite matrix. Moreover, the determinant of $\Sigma^I$ is a quadratic function of the correlation element that is changed. Thus, from the zeroes of this quadratic function, the range of the particular correlation element that satisfies the positive definite criterion may be determined.

An initial positive definite correlation matrix $\Sigma^{m \times m}$ may be used, where m is one greater than the number of attributes (i.e., the dimension of $(\underline{\alpha}, \theta)$. The matrix may be formed by generating an m x m matrix whose vectors lie on the positive surface of a unit sphere, A. Then, $AA^T$ is a positive definite matrix whose diagonal elements are one and off-diagonal elements are positive numbers less than one.

Using this initial $\Sigma$ as the first step in the Markov Chain, each candidate $\rho_{k_1 k_2}^I$ is drawn uniformly from the allowed correlations, satisfying both positive definiteness and the condition that they be non-negative. A Gibbs step is taken for each $\rho_{k_1 k_2}$ using $\rho_{k_1 k_2}^I$ as its candidate parameter. The likelihoods for this step are only based on the relationship between the current examinee parameters and the estimated correlational structure: $P(\theta_j, \underline{\alpha}_j | \Sigma)$. The diagonal elements of $\Sigma$ equal one and the off-diagonal elements equal $\rho_{k_1 k_2}$.

Although the Gibbs step for c is separate from the Gibbs step for $\pi^I$ and $R^I$ (steps 4 and 5 respectively), the structures for the two Gibbs steps may be nearly identical. For each item i, the candidate parameters are drawn: $(\pi_i^I)^I \sim N(\pi_i^I)^{I-1}, \tau_{\pi^I})$, $(r_i^I)^I \sim N((r_i^I-1, \pi_{r^I}), c_i^I \sim N(c_i^I-1, \tau_c), \tau_{k^I}, \tau_{r^I}$, and $\tau_c$ are determined experimentally by plots of the Markov Chain. Since the candidate distribution is symmetric the $J_t$ term is cancelled out of the Metropolis-Hastings ratio r.

The likelihoods are calculated by computing P(item i responses$|\pi_i^I, r_i^I, c_i^{I-1}, (\theta_j, \underline{\alpha}_j)^{I-1}, j=1, \ldots, n$)) for the Gibbs step involving $\pi_i^I$ and $r_i^I$, and P(item responses$|\pi_i^{I-1}, r_i^{I-1}, c_i, (\theta_j, \underline{\alpha}_j)^{I-1}, j=1, \ldots, n$)) for the Gibbs step involving $c_i$. The priors are computed using the Beta distributions with the hyperparameters from step 1.

The candidate vector of examinee parameters $(\overline{\alpha}^I, \theta^I)$ in Step 6 are drawn from $N(0, \Sigma)$, where the off-diagonal elements of $\Sigma$ are $\rho_{k_1 k_2}^I$. The elements of $\underline{\alpha}^I$ are then defined by the relationship between $\{\overline{\alpha}_k^I\}$ and the cutpoint $\kappa_k$, for each attribute k. Likelihoods are computed using p(item i responses$|\theta_j, \alpha_j, \pi_i^I, r_i^I, c_i^I, i=1, \ldots, I$).

Thus, the ratio r used in the computation of the Metropolis-Hastings algorithm reduces as follows:

$$r = \frac{P((\overline{\alpha}^*, \underline{\alpha}^*, \theta^*) | \text{data}) / J_t((\overline{\alpha}^*, \underline{\alpha}^*, \theta^*) | (\overline{\alpha}^{t-1}, \underline{\alpha}^{t-1} \theta^{t-1}))}{P((\overline{\alpha}^{t-1}, \underline{\alpha}^{t-1}, \theta^{t-1}) | \text{data}) / J_t((\overline{\alpha}^{t-1}, \underline{\alpha}^{t-1}, \theta^{t-1}) | (\overline{\alpha}^*, \underline{\alpha}^*, \theta^*))}$$

$$= \frac{P((\overline{\alpha}^*, \underline{\alpha}^*, \theta^*) | \text{data}) / P(\overline{\alpha}^*, \underline{\alpha}^*, \theta^*)}{P((\overline{\alpha}^{t-1}, \underline{\alpha}^{t-1}, \theta^{t-1}) | \text{data}) / P(\overline{\alpha}^{t-1}, \underline{\alpha}^{t-1}, \theta^{t-1})}$$

$$= \frac{P(\text{data} | (\overline{\alpha}^*, \underline{\alpha}^*, \theta^*)) P(\overline{\alpha}^*, \underline{\alpha}^*, \theta^*) / P(\overline{\alpha}^*, \underline{\alpha}^*, \theta^*)}{P(\text{data} | (\overline{\alpha}^{t-1}, \underline{\alpha}^{t-1}, \theta^{t-1})) P(\overline{\alpha}^{t-1}, \underline{\alpha}^{t-1}, \theta^{t-1}) / P(\overline{\alpha}^{t-1}, \underline{\alpha}^{t-1}, \theta^{t-1})}$$

$$= \frac{P(\text{data} | (\overline{\alpha}^*, \underline{\alpha}^*, \theta^*))}{P(\text{data} | (\overline{\alpha}^{t-1}, \underline{\alpha}^{t-1}, \theta^{t-1}))}$$

Software embodying the MCMC may be used to provide estimates of the examinee mastery parameters, estimates of the item parameters of the reparameterized unified model, and estimates of the Bayesian hyperparameters having non-fixed values. This software is referred to herein as the Arpeggio™ software application although additional or other software may be used to perform similar functions. The methodology may produce multiple Markov Chain runs with imputed values of various parameters and summary files that provide information on parameter estimates for the various assessment items and assessment examinees analyzed. In addition, the Arpeggio™ software may run MCMC simulations and provide summaries of the operation of these chain simulations.

Figure 4:
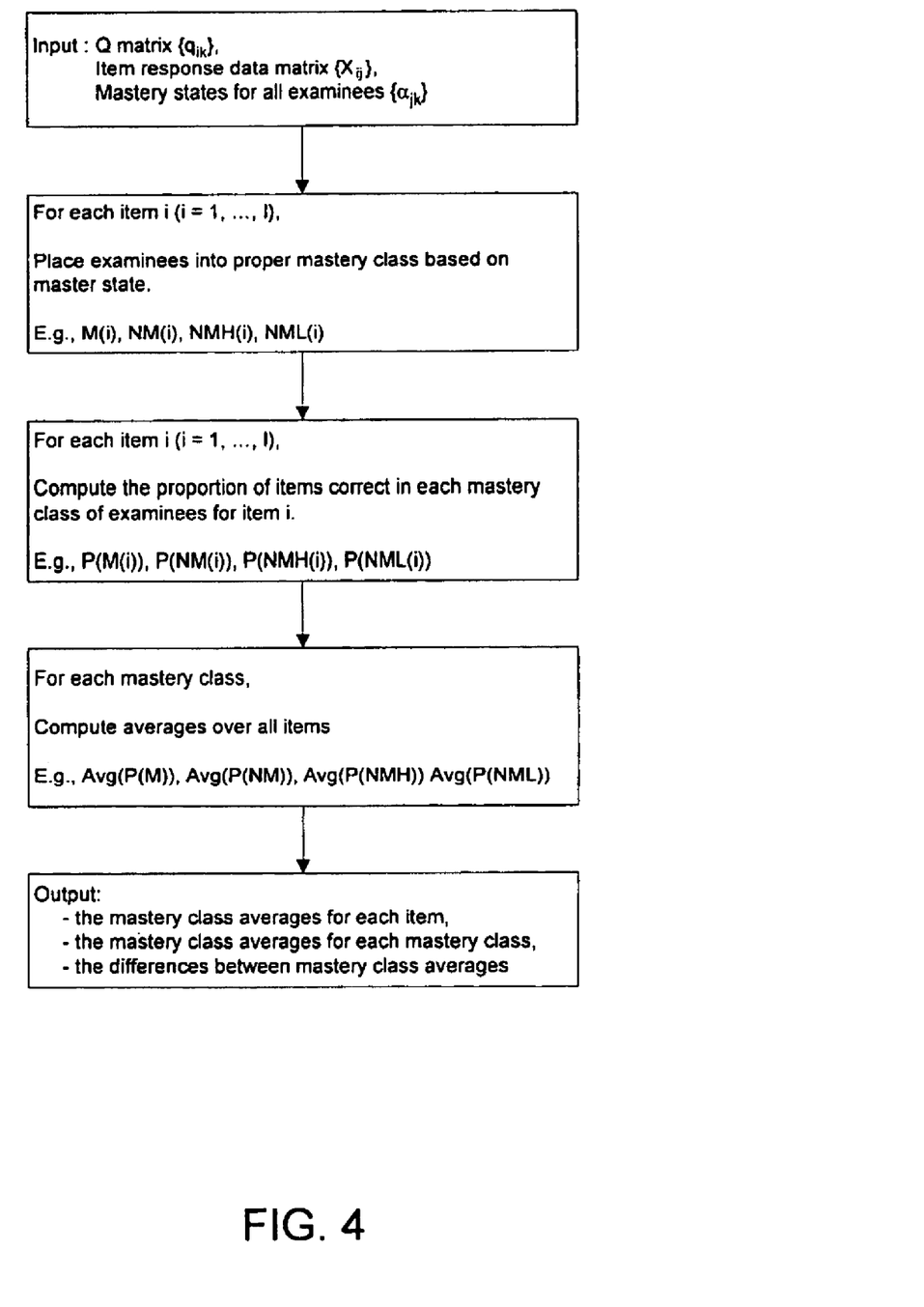
FIG. 4 depicts a flow chart for an exemplary method for generating examinee statistics according to an embodiment of the present invention.

Several companion software methodologies utilizing the output data received from the Arpeggio™ software to optimize the fit between the model produced by the software and the underlying data, are also described. For example, a software application may provide a statistical analysis of the mastery of one or more assessment items found on an assessment examination. This software application is referred to herein as the IMStats software application FIG. 4 depicts a flow chart of the operation of the IMStats software application. The IMStats software application may receive the Q matrix $\{q_{ik}\}$, the response matrix, $X_{ij}$, and the mastery estimate matrix $\alpha_{jk}$. For each item $i=1, \ldots, I$, examinees may be grouped into mastery classes. For example, four types of mastery classes may be created for each item: 1) "masters of item i" (i.e., those examinees that have not mastered all attributes required by item i), 2) "non-masters of item i" (i.e., those examinees that have not mastered all attributes required by item i), 3) "high non-masters of item i" (i.e. those examinees that have mastered at least one-half of all attributes, but not all attributes, required by and item i), and 4) "low non-masters of item i" (i.e., those examinees that have mastered less than one-half of all attributes required by an item i). Non-masters of item i are a superset containing all high non-masters of item i and all low non-masters of item i. In an embodiment, the EMStats software application may not compute one or more of the classes.

After the examinees are assigned to each class for an item, the proportion of examinees in each class that answered the item correctly is determined. These proportions are then averaged over all items under consideration for each type of class (e.g., the average proportion for "masters of item i" for all i=1, . . . I). In an embodiment, the resulting output may include
the averages for each type of class, the difference between the average proportion for all "masters of item i" and the average proportion for all "non-masters of item i," and the difference between the average proportion for all "masters of item i" and the average proportion for all "low non-masters of item i." In an embodiment, the difference between the average proportion for all "masters of item i" and the average proportion for all "high non-masters of item i" may be outputted. In an embodiment, the proportions may be outputted for one or more items. In an embodiment, the difference between the proportion for "masters of item i" and the proportion for "non-masters of item i," the proportion for "high non-masters of item i," and/or the proportion for "low non-masters of item i" for a particular item may be outputted.

In an embodiment, the present invention may include a software application that statistically analyzes the mastery of allowable examinees on a particular assessment examination. This software is referred to herein as the EMStats software application.

Figure 5:
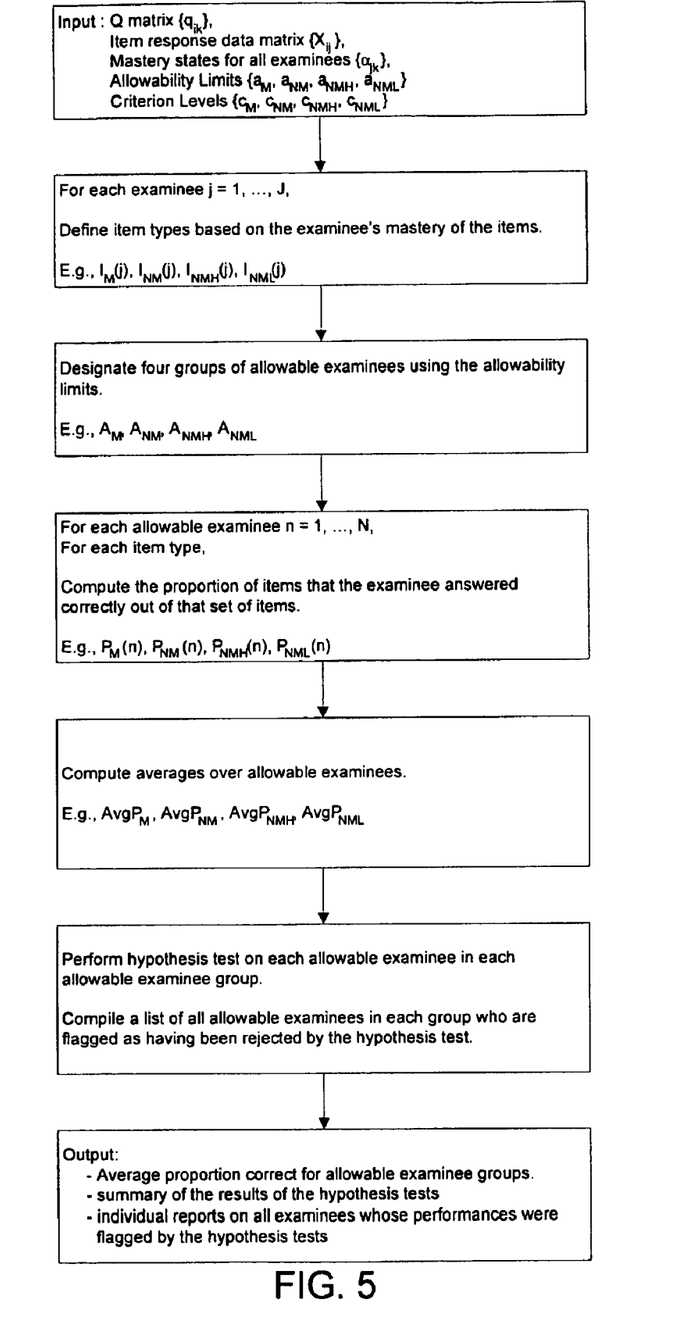
FIG. 5 depicts a flow chart for an exemplary method for generating assessment item statistics according to an embodiment of the present invention.

FIG. 5 depicts a flow chart of the operation of the EMStats software application. The EMStats software application may receive the Q matrix $\{q_{ik}\}$, the response matrix, $X_{ij}$, the mastery estimate matrix $\alpha_{jk}$, allowability limits for each mastery class defined with respect of the IMSTATS software application $\{a_M, a_{NM}, a_{NMH}, a_{NML}\}$, and criterion limits for each mastery class $\{c_M, c_{NM}, c_{NMH}, c_{NML}\}$.

The allowability limits may be equal to the minimum number of responses to assessment items required for an examinee to be counted as a member of a corresponding mastery class. For example, if $a_M$=14 items an examinee that has mastered 12 items would not be included when generating the outputs. In contrast, an examinee that has mastered 15 items would be included when generating the outputs. The criterion levels may be equal to the proportion correct criteria required to perform a binomial hypothesis test with confidence=0.05 for each of the mastery classes.

For each examinee j=1, . . . , J, items may be grouped into item classes. For example, four item classes may be created for each examinee: 1) "mastered items" (i.e. those items for which the examinee has mastered all attributes), 2) "non-mastered items" (i.e., those items for which the examinee has not mastered all attributes), 3) "non-mastered items" (i.e., those items for which the examinee has mastered at least one-half, but not all, attributes), and 4) "low non-mastered items" (i.e., those items for which the examinee has mastered less than one-half of all attributes). Non-mastered items are a superset containing high non-mastered items and low non-mastered items. In an embodiment, the EMStats software application may not compute one or more of the classes.

After the items are assigned to each class for an examinee, a group of allowable examinees may be determined using the allowability limits for each item class. For each allowable examinee n=1, . . . , N and for each of the item classes, the proportion of items that the allowable examinee answered correctly out of the set of items may be computed. The average proportion of items answered correctly by each examinee may then be computed for each item class. A hypothesis test may be performed on each examinee in each allowable examinee group. A list of the examinees in each allowable examinee group who were rejected by the hypothesis test may be generated for each allowable examinee group. The EMStats software application may output one or more of the average proportion of items answered correctly for each item class, the number of items answered correctly by each allowable examinee, the lists of examinees that were rejected by the hypothesis test, and/or any other statistics generated by the EMStats software application.

In an embodiment, the present invention may include a software application that utilizes a reparameterized unified model in computing expected examinee performance across assessment items as a function of an examinee's predicted skill set. This software application is referred to herein as the FusionStats software application.

Figure 6:
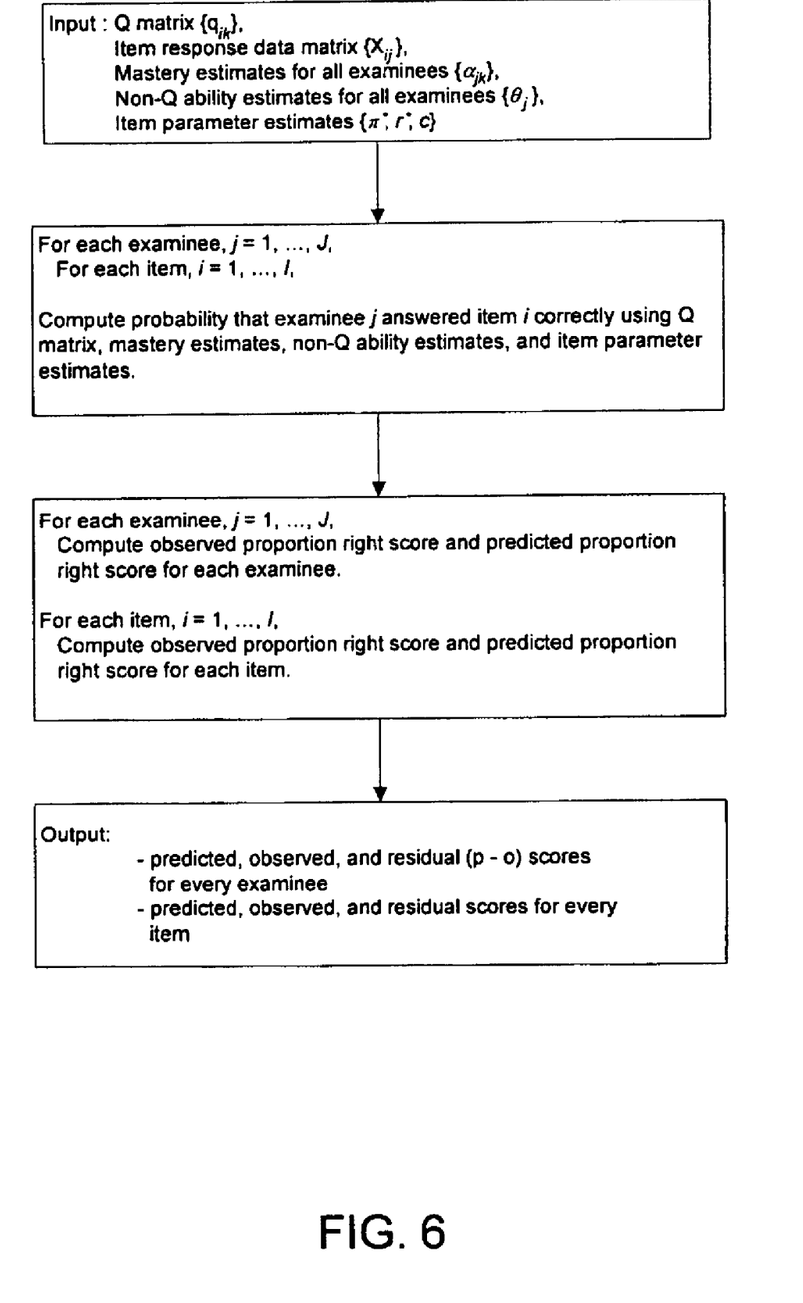
FIG. 6 depicts a flow chart for an exemplary method for generating coordinated examinee and assessment item statistics according to an embodiment of the present invention.

FIG. 6 depicts a flow chart of the operation of the FusionStats software application. The EMStats software application may receive the Q matrix $\{q_{ik}\}$, the response matrix, $X_{ij}$, the mastery estimate matrix, $\alpha_{jk}$, estimates for the attributes not included in the Q matrix for each examinee, $\theta_j$, and item parameter estimates $\{\pi', r', c\}$.

For each examinee j=1, . . . , J, for each item i=1, . . . , I, the probability that an examinee j answered item i correctly may be computed using the Q matrix, the mastery estimate matrix, the estimates for the attributes not included in the Q matrix, and the item parameter estimates. These values may be entered into an I×J matrix where each entry $P_{ij}$ represents the probability that examinee j answered item i correctly. For each examinee j, summing the entries in $P_{ij}$ corresponding to the examinee may produce a predicted examinee score. For each item i, summing the entries in $P_{ij}$ corresponding to the item may produce a predicted item score. Similarly, summing the rows and columns of $X_{ij}$ may produce observed examinee scores and observed item scores. A residual examinee score may then be computed by subtracting the observed examinee score from the predicted examinee score. A residual item score may be computed by subtracting the observed item score from the predicted item score. In an embodiment, the residual score may be the absolute value of the differences computed above.

The predicted, observed, and residual scores may be outputted for each examinee and item. Other outputs may include average residual scores for all examinees and items. Such measurements may be used to evaluate the efficacy of the parameters used.

In an embodiment, the present invention may include a software application that evaluates the effectiveness of the fit of the fusion model to the data. The software application is referred to herein as the GAMEStats software application. The GAMEStats software application may be used to create optimal mastery settings that identify the level of skill required for achieving the mastery level in the tested underlying latent space. Deriving these optimal settings from the data may require optimizing the fit between the model and the underlying data. The GAMEStats software may utilize a genetic algorithm to determine how to optimize these settings and the fit between the model and the data. The genetic algorithm may maximize the equation $p_{diff}$=average ($p_m$–

$p_{nmh}$, $p_m-p_{nml}$) to calculate the average of the difference between masters and high non-masters and the difference between masters and low non-masters. In this notation, $p_m$ corresponds to the average proportion correct for item high non-master, and $p_{nmh}$ corresponds to the average proportion correct for item low non-masters.

Figure 7:
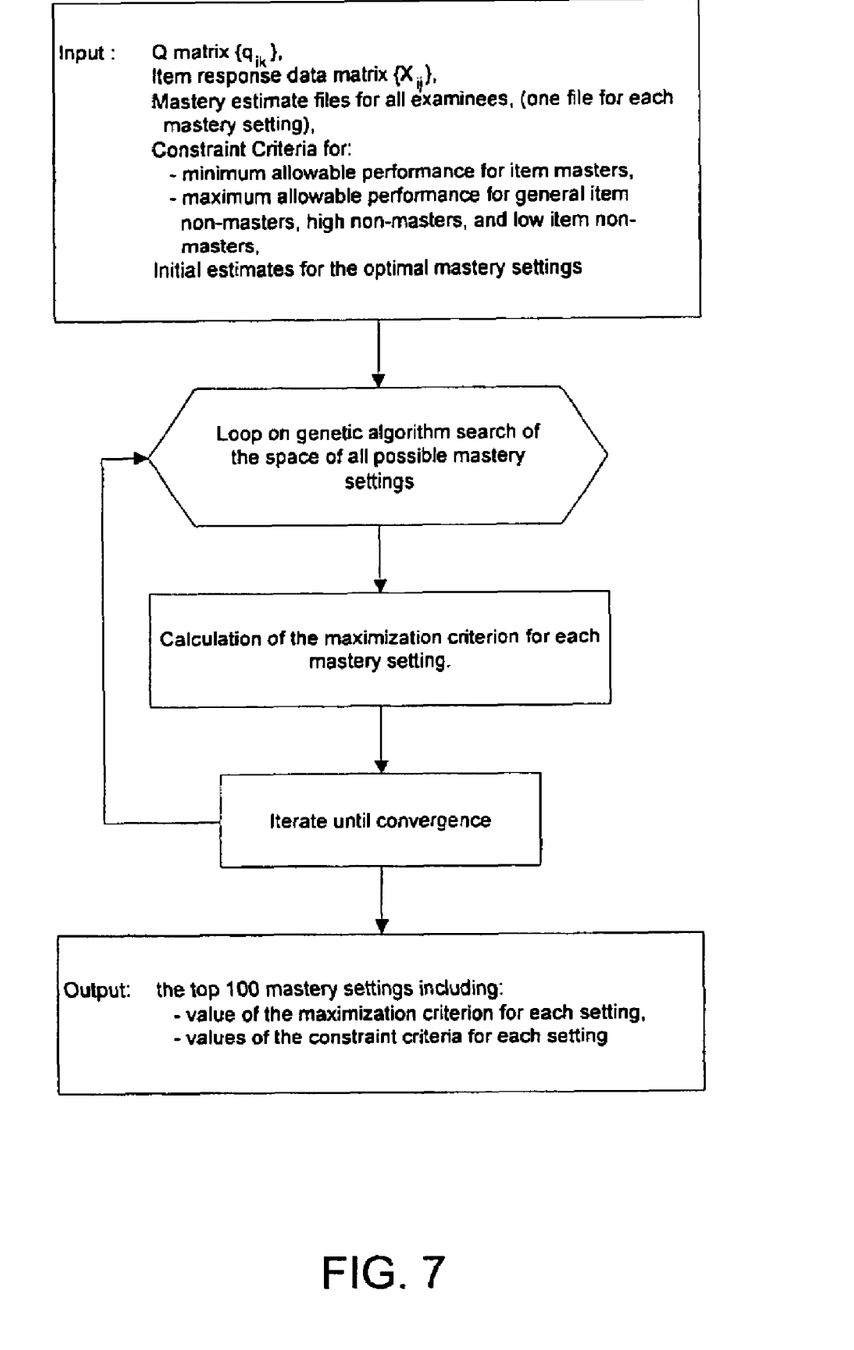
FIG. 7 depicts a flow chart for an exemplary method for optimizing mastery threshold parameters according to an embodiment of the present invention.

FIG. 7 is a flow chart of the GAMEStats software application. As shown in FIG. 7, the GAMEStats software application may receive the Q-matrix, an item response data matrix and various mastery estimates and parameters for optimizing the mastery settings as inputs. These inputs may be iteratively processed and a calculation of the maximization criteria for each mastery setting may be performed. These operations are iteratively performed until the maximization criteria converge within an acceptable range. The resulting output may include, for example, the top 100 mastery settings with a value for the maximization criteria for each setting and values for the constraint criteria for each setting.

Figure 8:
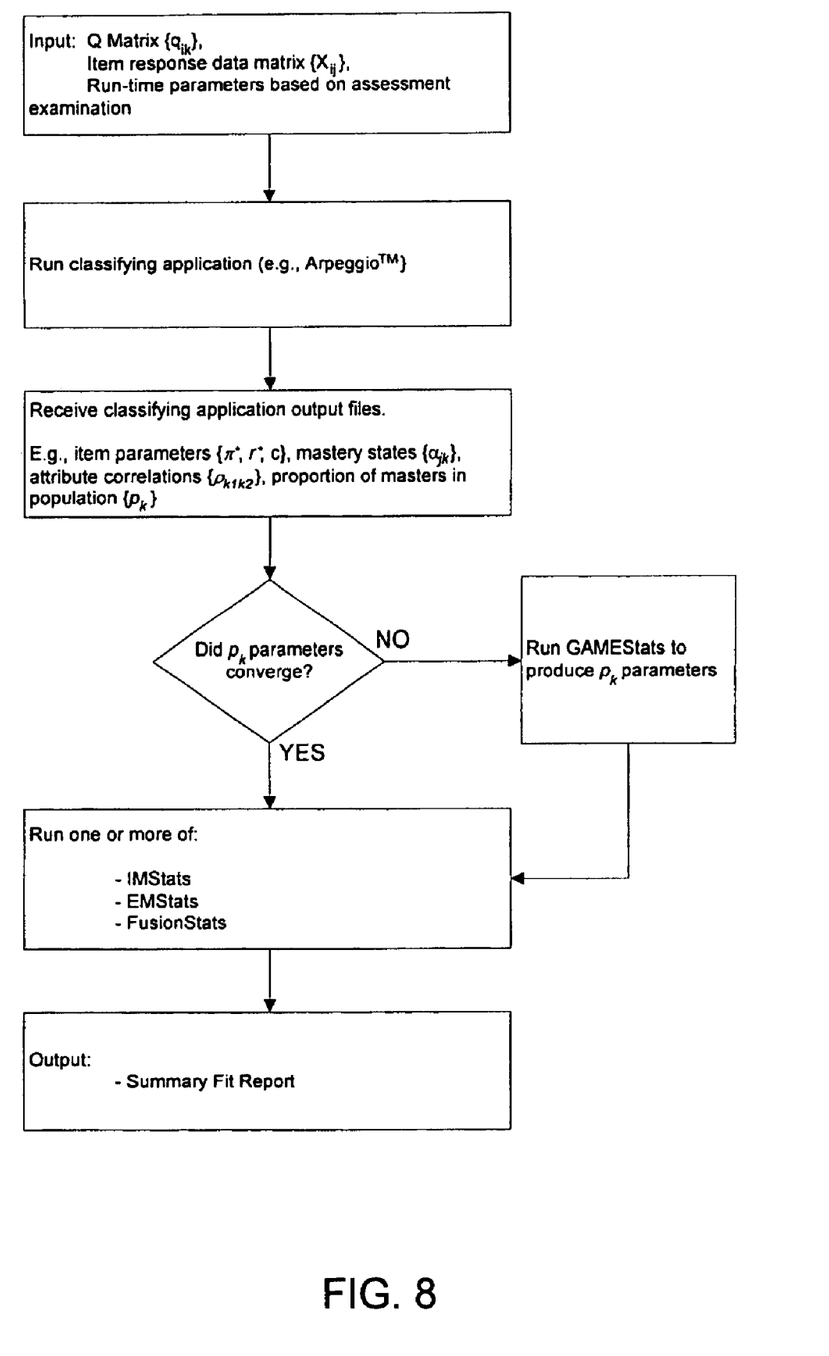
FIG. 8 depicts a flow chart of the interrelationship between the exemplary methods described in FIGS. 4-7.

FIG. 8 depicts a flow chart of the operation of the above-defined software applications with the classifier, such as Arpeggio™. Inputs to the classifier may include one or more of the Q matrix $\{q_{ik}\}$, the response matrix, $X_{ij}$, and any run-time parameters specific to the assessment examination. The operations of the classifier may then be performed. In an embodiment, the output of the classifier may include item parameters $\{\pi^j, r^j, c\}$; the mastery estimates, $\alpha_{jk}$, a correlation matrix between attributes $\{\rho_{k1k2}\}$, and a proportion of the number of masters for each attribute with respect to the number of examinees $\{p_k\}$. If the proportions of the number of masters for each attribute with respect to the number of examinees do not converge, the GAMEStats software application may be performed to perform converge the proportions. Otherwise or upon completion of GAMEStats, the operations of one or more of IMStats, EMStats, and FusionStats may be performed. Upon completion a summary fit report may be generated denoting the fit of the raw data to the model data.

While the present invention has been described in conjunction with particular applications as outlined above, it is evident that may alternatives, modifications and variations will be apparent to one of ordinary skill in the art. Accordingly, the particular applications of this invention as set forth above are intended to be illustrative, not limiting. Modifications or changes may be made without departing from the spirit or scope of the invention, or may become obvious to one skilled in the art after review of the present invention. Such modifications or changes are intended to be included within the scope of this present application.

What is claimed is:

1. A computer implemented method for evaluating the fit of raw data to model data, the method comprising:
   receiving a plurality of associations, each pertaining to a relationship between one of a plurality of assessment items for an assessment examination and one of a plurality of attributes;
   receiving a plurality of responses, each pertaining to an answer by one of a plurality of examinees to one of the assessment items;
   receiving a plurality of mastery estimates, each representing whether one of the examinees has mastered one of the attributes;
   determining whether an examinee falls into at least one of a plurality of examinee classes for an assessment item based upon the mastery estimates for the examinee and the associations for the assessment item, wherein the examinee classes comprise:
      a master class associated with an assessment item, wherein the master class comprises all examinees having a mastery estimate for each attribute associated with the assessment item,
      a high non-master class associated with the assessment item and comprising all examinees having a mastery estimate for at least one-half of all attributes, but not all attributes, associated with the assessment item, and
      a low non-master class associated with the assessment item comprising all examinees having a mastery estimate for less that one-half of all attributes associated with the assessment item;
   generating one or more statistics, each based on one or more of the associations, responses and mastery estimates, and comprising a difference between a percentage of correct answers for the assessment examination for the high non-master class for the assessment item and the percentage of correct answers for the assessment examination for the low non-master class for the assessment item; and
   outputting at least one of the statistics.

2. A computer implemented method for evaluating the fit of raw data to model data, the method comprising:
   receiving a plurality of associations, each pertaining to a relationship between one of a plurality of assessment items for an assessment examination and one of a plurality of attributes;
   receiving a plurality of responses, each pertaining to an answer by one of a plurality of examinees to one of the assessment items;
   receiving a plurality of mastery estimates, each representing whether one of the examinees has mastered one of the attributes;
   receiving one or more parameters based on an expected assessment item performance;
   determining whether an item for an examinee falls into at least one of a plurality of item classes based upon the mastery estimates for the examinee and the associations for the assessment item;
   generating one or more statistics, each based on one or more of the associations, responses, mastery estimates and parameters;
   outputting at least one of the statistics; and
   receiving one or more allowability limits, each defining a threshold number of items for each of a plurality of item classes reciuired for an examinee to be an allowable examinee,
   wherein the determining step further comprises:
      defining a plurality of item types;
      determining a list of allowable examinees for each item class based on the allowability limit; and
      for each allowable examinee for an item class, computing a proportion of items in the item class that the allowable examinee answered correctly;
   wherein the statistics comprise a number of items correct for each allowable examinee.

3. A computer implemented method for evaluating the fit of raw data to model data, the method comprising:
   receiving a plurality of associations, each pertaining to a relationship between one of a plurality of assessment items for an assessment examination and one of a plurality of attributes;
   receiving a plurality of responses, each pertaining to an answer by one of a plurality of examinees to one of the assessment items;

receiving a plurality of mastery estimate files, each containing a set of mastery estimates, each mastery estimate representing whether one of the examinees has mastered one of the attributes;

receiving a plurality of mastery parameters;

determining whether each examinee falls into at least one of a plurality of examinee classes for an assessment item based upon the mastery probabilities for the examinee and the associations for the assessment item;

optimizing a plurality of mastery thresholds;

generating one or more statistics, each based on one or more of the associations, responses, mastery probabilities and mastery parameters, the statistics comprising one or more mastery thresholds; and outputting at least one of the statistics, wherein the examinee classes comprise a master class, a high non-master class, and a low non-master class, wherein the statistics comprise one or more of the average proportion correct for the master class, the average proportion correct for the high non-master class, and the average proportion correct for the low non-master class.

4. A computer implemented method for evaluating the fit of raw data to model data, the method comprising:

receiving a plurality of associations, each pertaining to a relationship between one of a plurality of assessment items for an assessment examination and one of a plurality of attributes;

receiving a plurality of responses, each pertaining to an answer by one of a plurality of examinees to one of the assessment items;

receiving a plurality of mastery estimates files, each containing a set of mastery estimates, each mastery estimate representing whether one of the examinees has mastered one of the attributes;

receiving a plurality of mastery parameters;

determining whether each examinee falls into at least one of a plurality of examinee classes for an assessment item based upon the mastery probabilities for the examinee and the associations for the assessment item;

optimizing a plurality of mastery thresholds by:

for each examinee class, performing a genetic algorithm using the associations, responses, mastery estimates and mastery parameters to obtain a result;

calculating maximization criteria based on the results for each examinee class;

applying the maximization criteria to the mastery thresholds; and repeating the performing, calculating and applying steps until the mastery thresholds converge within a threshold range;

generating one or more statistics, each based on the associations, responses, mastery probabilities and mastery parameters, wherein the statistics comprise one or more mastery thresholds; and outputting at least one of the statistics.

5. A computer implemented method for evaluating the fit of raw data to model data, the method comprising:

receiving a plurality of associations, each pertaining to a relationship between one of a plurality of assessment items for an assessment examination and one of a plurality of attributes;

receiving a plurality of responses, each pertaining to an answer by one of a plurality of examinees to one of the assessment items;

receiving a plurality of mastery estimates, each representing whether one of the examinees has mastered one of the attributes;

receiving a plurality of proficiency estimates for non-tested attributes for each examinee;

receiving a plurality of item parameter estimates for each item;

generating one or more statistics, each based on one or more of the associations, responses, mastery probabilities, proficiency estimates, and item probabilities; and outputting at least one of the statistics, wherein the statistics comprise:

for each examinee and each item, determining a probability that the examinee answered the item correctly based on the associations, mastery estimates, proficiency estimates and item parameter estimates, and one or more of the following, for each examinee:

an observed score computed by summing the responses by the examinee;

a predicted score computed by summing the probabilities associated with the examinee; and a residual score computed by subtracting the observed score from the predicted score and taking the absolute value of the result, and one or more of the following, for each item:

an observed score computed by summing the responses to the item;

a predicted score computed by summing the probabilities associated with the item; and a residual score computed by subtracting the observed score from the predicted score and taking the absolute value of the result.

* * * * *